July 31, 1923.

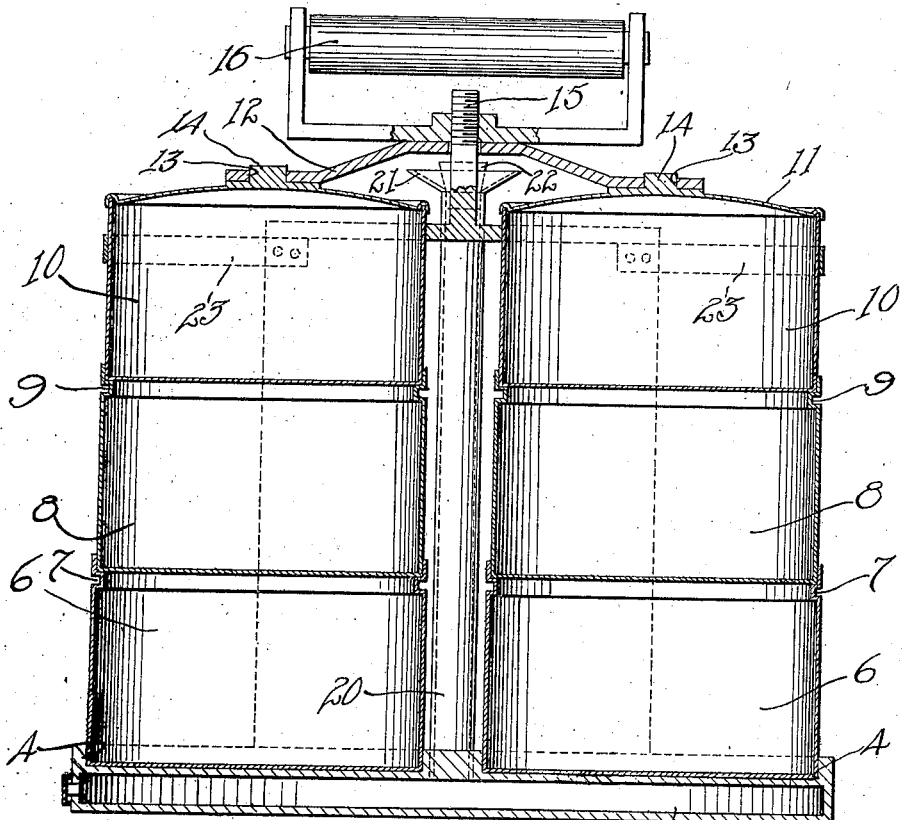
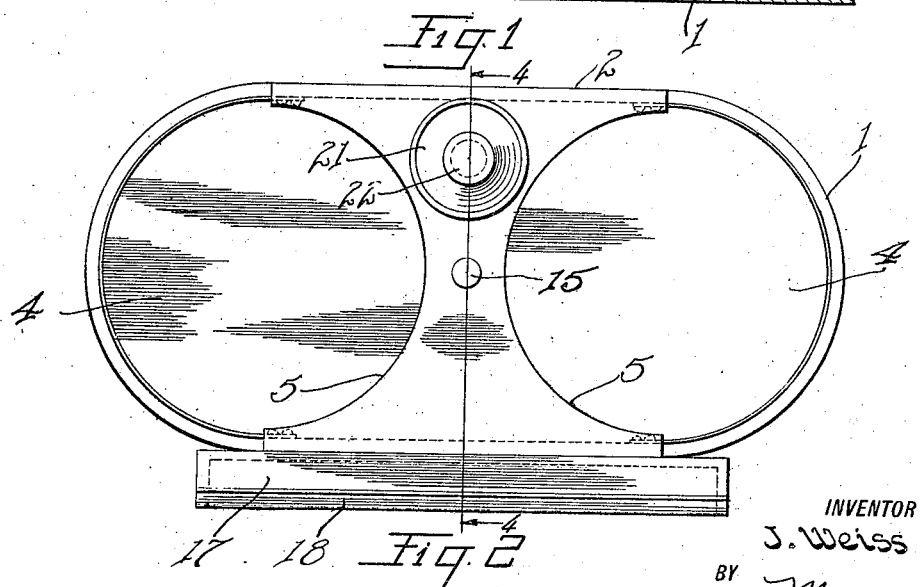

J. WEISS 1,463,411

LUNCH HEATER AND CARRIER

Filed Sept. 5, 1922

INVENTOR
J. Weiss
BY
ATTORNEYS

Patented July 31, 1923.

1,463,411

UNITED STATES PATENT OFFICE.

JOSEPH WEISS, OF CHICAGO, ILLINOIS.

LUNCH HEATER AND CARRIER.

Application filed September 5, 1922. Serial No. 586,242.

*To all whom it may concern:*

Be it known that I, JOSEPH WEISS, a citizen of the United States, and a resident of Chicago, in the county of Cook and State of Illinois, have invented a new and useful Improvement in Lunch Heaters and Carriers, of which the following is a full, clear, and exact description.

My invention relates to improvements in lunch heaters and carriers, and it consists in the combination, constructions, and arrangements herein described and claimed.

An object of my invention is to provide a lunch heater and carrier, which may be placed over a fire to warm the contents in the carrier, the carrier being constructed so that the fire cannot burn the food.

A further object of my invention is to provide a device of the type described in which a plurality of telescoping receptacles are disposed, whereby different kinds of food are kept separate, and the device when assembled forms a compact unit.

A further object of my invention is to provide a device of the type described which has novel means for warming the food.

A further object of my invention is to provide a device of the type described which has a compartment for carrying the necessary silver ware.

A further object of my invention is to provide a device of the type described which is simple in construction, compact in design and which is not likely to easily get out of order.

Other objects and advantages will appear in the following specification, and the novel features of the invention will be particularly pointed out in the appended claims.

My invention is illustrated in the accompanying drawings forming part of this application, in which—

Figure 1 is a vertical section through the device,

Figure 2 is a plan view of the device with the receptacles removed,

Figure 3:
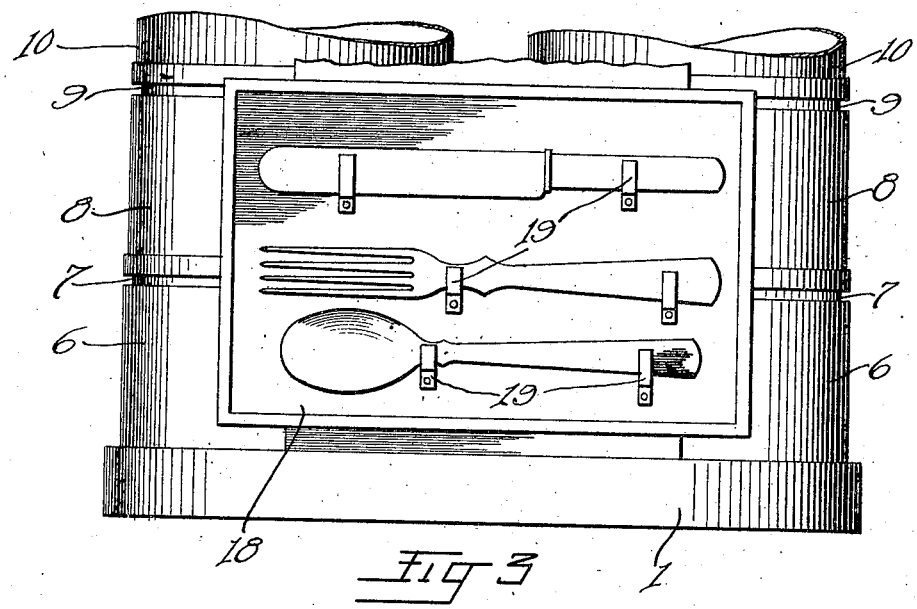
Figure 3 is a side elevation of a portion of the device.
Figure 4:
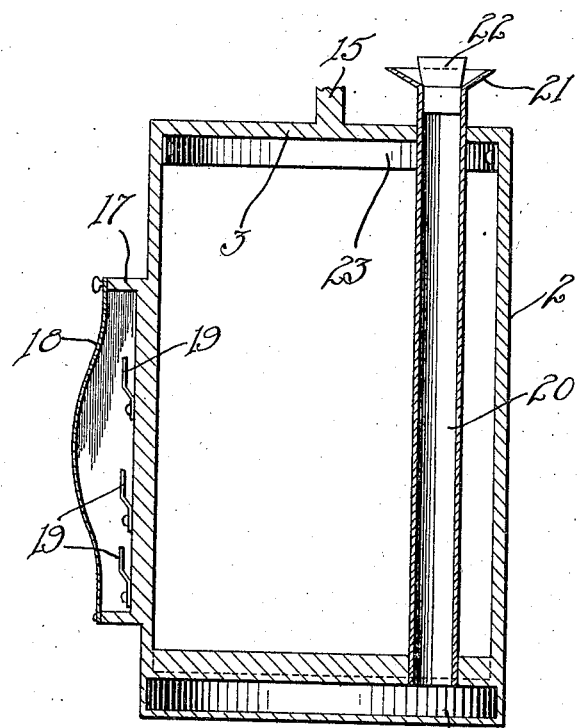
Figure 4 is a section along the line 4—4 of Figure 3.

In carrying out my invention, I provide a receptacle carrying frame which comprises a hollow base 1, side walls 2, and a top plate 3. It will be noted that the base 1 has depressions 4 therein, and that the free ends of the plate 3 are provided with arcuate shaped recesses 5.

Food retaining receptacles are disposed in the depressions 4 and recesses 5. In the present form of the device, I have shown the food receptacles in two columns, with three receptacles in each column. It is obvious, however, that any number of columns may be provided, and as many receptacles in each column may be used as desired. The top and middle receptacles act as the covers for their adjacent receptacles therebeneath. The lowermost receptacle 6 is disposed in the depression 4 and has an inwardly extending flange 7, which supports the receptacle 8. In like manner, the receptacle 8 has a flange 9 which carries the receptacle 10. The receptacles 8 and 10 fit snugly into the receptacles therebeneath, thus providing liquid tight covers. The receptacle 10 has a cover 11 which is adapted to be held in place by a yoke 12.

I have described the receptacles in detail which comprise one of the columns. The receptacles in the other column are identical to those in the first and therefore need no further description. Like parts will be given like reference numerals. The yoke 12 engages with both of the covers 11, and securely holds them in closed position. The yoke has openings 13 in the ends thereof which are adapted to receive lugs 14 that are carried by the covers 11. In this manner the yoke is prevented from moving with respect to the covers. A stud 15 projects upwardly from the top 3 and loosely receives the yoke 12. A handle 16 is screwed onto the stud 15 and securely locks the yoke 12 in place. One of the side walls 2 is provided with a compartment 17 in which the desired silver ware may be disposed. The cover 18, which closes the compartment is hinged at its lower edge, whereby ready access may be had to the compartment. Clips 19 within the compartment hold the silverware against rattling.

From the foregoing description of the various parts of the device, the operation thereof may be readily understood. It will be noted that the reservoir 1 has an inlet pipe 20 which projects through the plate 3 and terminates in a funnel-shaped opening 21. A cork 22 is normally disposed over the opening 21, to prevent the water from splashing out. When using the carrier, as many receptacles as desired may be filled with food. The receptacles are constructed so as to readily retain any kind of food either in a solid or liquid state. In the present form of the device, six different kinds of food or less may be carried. It is obvious that by merely increasing the number of receptacles, the variety of food carried by the device may be increased.

When the receptacles are filled with food, they are disposed in the device. The receptacles 6 and 8 are first placed in position, and then the receptacle 10. Arcuate-shaped retaining wires 23 are disposed adjacent to the top of the device, and keep the receptacles 10 in the recesses 5. The interlocking of the receptacles with each other together with the depressions 4, recesses 5, and wires 23, securely hold the receptacles in position. The yoke 12, and the handle 16 are then assembled to the device. If desirable, the reservoir 1 may be filled with hot water whereby the contents of the carrier will be kept hot for quite a while. If it is desired to heat the lunch, it is merely necessary to place the carrier over a fire, whereupon the water within the reservoir will effectually warm the food. The cork 22 is removed when the water is heated. The inlet pipe 20 then acts as an overflow pipe in case the water should boil over. The silverware is always ready for instant use. The device is simple in construction and provides an efficient means for carrying a lunch which may be heated before eating.

I claim:

1. A device of the type described comprising a frame consisting of top and side plates, and a hollow base adapted to hold water, an inlet pipe communicating with said base and projecting through said top plate, said base having depressions therein, interlocking receptacles constituting a single unit when assembled, the lowermost receptacle of each unit being disposed in one of the depressions, and strips carried by said frame for securing the upper receptacles to said frame.

2. A device of the type described comprising a frame consisting of top and side plates, and a hollow base adapted to hold water, an inlet pipe communicating with said base and projecting through said top plate, said base having depressions therein, interlocking receptacles constituting a single unit when assembled, the lowermost receptacle of each unit being disposed in one of the depressions, strips carried by said frame for securing the upper receptacles to said frame, and a compartment carried by one of said side walls and being adapted to hold silverware therein.

JOSEPH WEISS.